United States Patent [19]
Lanore

[11] 3,728,923
[45] Apr. 24, 1973

[54] CUTTING GUIDE, NOTABLY FOR CIGARETTE MAKING MACHINES

[75] Inventor: Raymond Lanore, Paris, France
[73] Assignee: Usines Decoufle, Paris, France
[22] Filed: July 29, 1971
[21] Appl. No.: 167,244

[30] Foreign Application Priority Data

Aug. 3, 1970 France..............................7028595

[52] U.S. Cl. ......................83/318, 83/310, 83/327, 74/86
[51] Int. Cl. ..............................................B23d 25/04
[58] Field of Search....................83/19, 20, 310, 318, 83/327, 228; 74/86

[56] References Cited

UNITED STATES PATENTS

| 3,440,912 | 4/1969 | Verjux | 83/310 |
| 2,585,579 | 2/1952 | Norden | 74/86 X |
| 3,605,838 | 9/1971 | Gianese | 83/327 |
| 3,329,053 | 7/1967 | Kleineberg | 83/327 X |

Primary Examiner—Andrew R. Juhasz
Assistant Examiner—W. D. Bray
Attorney—Morton Amster et al.

[57] ABSTRACT

These cutter guides are of the type adapted to move while remaining constantly parallel to themselves and perpendicular to the cigarette rod, and rotating about an axis at a uniform tangential speed equal to the feed rate of said rod. Said guides are carried by a rigid connecting plate comprising three bearings mounted on three crankpins of corresponding separate similar disks one of said disks being rotatably driven while the others revolve freely about their axes. The construction is particularly simple and light in weight.

3 Claims, 2 Drawing Figures

PATENTED APR 24 1973  3,728,923

INVENTOR:
RAYMOND LANORE
BY
Amster Rothstein
ATTORNEYS.

CUTTING GUIDE, NOTABLY FOR CIGARETTE MAKING MACHINES

BACKGROUND OF THE INVENTION

Cigarette-making machines in actual use are designed for making a continuous rectilinear or endless tobacco rod which is subsequently cut into sections of equal length by means of a cutting device; now these machines have a production rate of several thousands cigarettes per minute, so that the rod travels at a speed of hundreds of meters per minute.

The cutting devices usually employed to this end comprise a rotary plate adapted to revolve about its axis and carrying a very thin blade cutting the rod while travelling at the same speed as the rod. To obtain a clean cut, the rod on the one hand and the thin blade on the other hand must be guided and held. This guiding action is provided by a pair of flanges or plates disposed on either side of the blade and usually referred to as cutter guides. These cutter guides must of course be adapted to travel with the blade, and therefore at the same speed as the rod, during the actual cutting operation.

The most popular way of controlling these cutter guides consists in utilizing a device to which a reciprocating motion is imparted through a crank driven from the eccentric crankpin of a rotary plate. At present speeds corresponding to the manufacture of several hundreds of cigarettes per minute, this device is exposed to considerable wear and tear, and constitutes a source of vibration transmitted to the entire machine.

To avoid this inconvenience, various propositions utilizing only rotary component elements or members driven with a continuous uniform motion have been made. These systems are of the plate or chain type comprising a complete set of cutter guides. Since cigarette-making machines must be capable of cutting the rod into sections of different lengths, according to requirements, these systems are objectionable in that they involve considerable mechanical modifications for changing the length of the desired product, for the plate or chain should comprise a number of integral gaps, pitches or links corresponding in length to the size of the cigarette to be cut.

SUMMARY OF THE INVENTION

The device according to this invention is a continuous-motion one easily adaptable to the various lengths to be obtained; in this field, various devices have already been proposed wherein the cutter guides travel while remaining constantly parallel to themselves and perpendicular to the cigarette twist, by rotating about an axis at a uniform tangential speed equal to the linear speed of the tobacco twist.

The device according to the present invention is a cutting device of this last-mentioned character, wherein the cutter guides proper are carried by a rigid connecting-plate comprising three bearings mounted on three crankpins of three similar crankpin-supporting disks, one of these disks being rotatably driven, the other two being adapted to rotate freely.

Thus, during the rotation of the driven disk, the cutting guides remain parallel to themselves.

The driven rotary disk revolves at such speed that it performs a complete revolution during the time necessary for the tobacco rod to be fed by a length corresponding to the length $L$ of a cigarette. Let $E$ be the common throw of the three crankpins carried by said three disks; the tangential speed of the cutter guide is equal to the rod feed if the throw $E$ is adjusted according to the value resulting from the equality $2E = L$.

BRIEF DESCRIPTION OF THE DRAWING

The attached drawing illustrates diagrammatically by way of example a typical form of embodiment of the present invention. In the drawing.

DESCRIPTION OF THE PREFERRED EMBODIMENT

Figure 1:
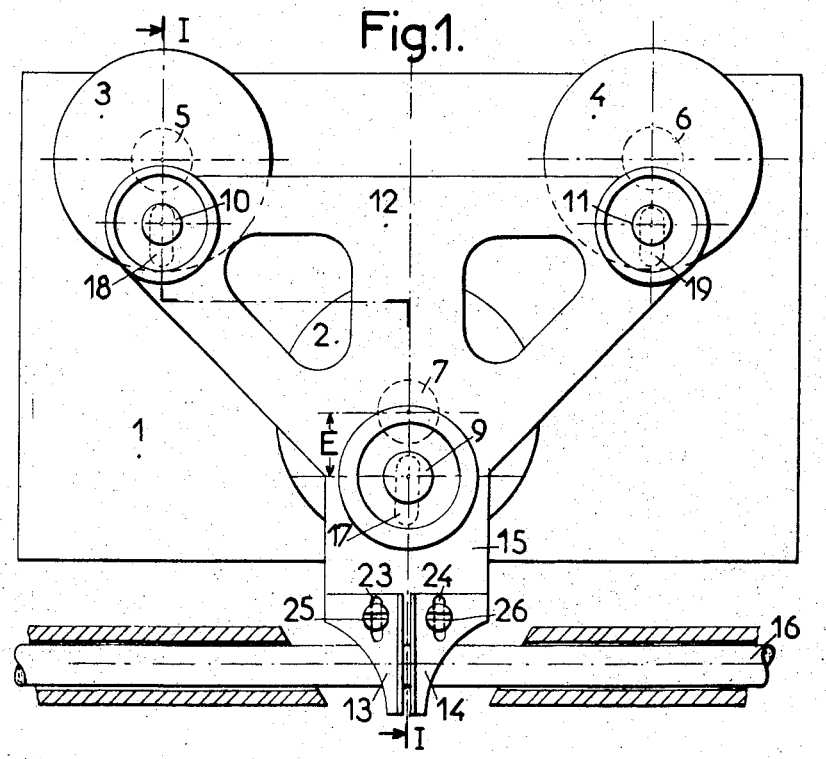
FIG. 1 is an elevational view of the device.

The main frame or structure 1 of the machine has rotatably mounted thereon three disks 2, 3 and 4. The shafts 5 and 6 of disks 3 and 4 respectively are mounted for loose rotation in bearings fitted in the frame structure 1; on the other hand the disk 2 is rotatably driven through a pinion 8 keyed on shaft 7. Each disk 2, 3 and 4 carries eccentric or crank pins 9, 10 and 11 respectively. These crankpins 9, 10 and 11 are interconnected by a common connecting plate 12 formed to this end with suitable bearings. The notched or open cutter guides 13 and 14 are secured to an extension 15 of plate 12.

Figure 2:
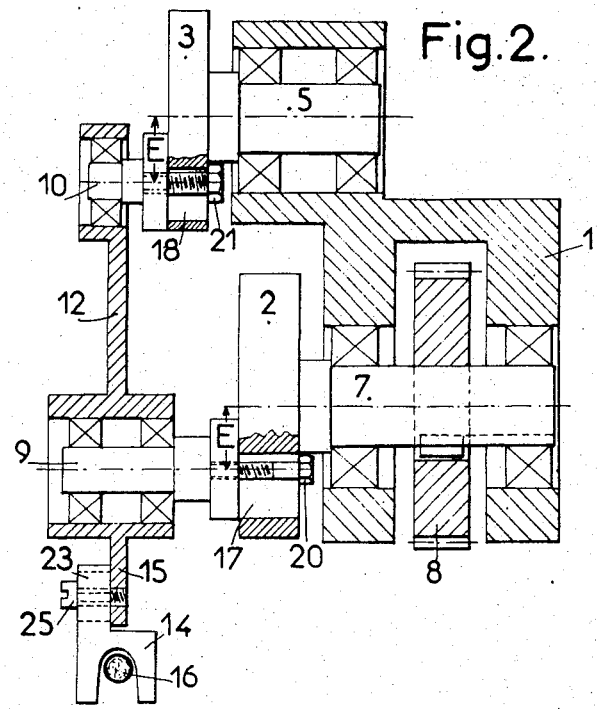
FIG. 2 is a section taken along the broken line I—I of FIG. 1.

As shown by FIG. 2, the connecting plate 12 has substantially the shape of an isosceles triangle having a center line perpendicular to the cigarette rod 16, the bearings being disposed adjacent the vertices, the drive being applied to the driven crankpin, positioned on said center line of the connecting plate and which is the bearing nearest to the rod of tobacco, and the cutter guides are fixed to the lower part of the connecting plate 12, under the driven bearing and have the same center line as said connecting plate.

The arrangement is such that the pinion 8 accomplishes a full revolution when the rod 16 is fed by the length of one cigarette; the same applies to the driven disk 2, its crankpin or shaft 9 and the cutter guides 13 and 14.

The crankpin or shaft 9 describes about the axis 7 of disk 2 a circle having a radius $E$ and all points rigid therewith, notably all the points of the cutter guide, describe circles having the same radius $E$, which are deducted by mutual translation. The cutter guides 13, 14 are thus caused to move parallel to themselves.

If for instance the rod 16 is horizontal and the cutter guides lie above the rod, the cut will take place when the cutter guides 13, 14 are in their lowermost position tangent to the rod 16.

If the length $L$ of the cigarette to be cut varies, the throw $E$ must be changed to impart thereto the value corresponding to the equality $2E = L$. This throw may be varied by shifting the crankpins 9, 10 and 11 on their corresponding disks 2, 3 and 4, in vertical elongated apertures 17, 18 and 19 provided to this end, and then these crank-pins are locked in the desired eccentric position by tightening the bolts 20, 21 and 22; then the cutter guides 13, 14 are properly positioned in relation to the rod 16 by moving the former in the proper direction on the extension 15 of connecting plate 12 by means of the vertical elongated apertures 23, 24 and bolts 25, 26.

Of course, the specific form of embodiment illustrated and described herein should not be construed as limiting the scope of the invention since it is given by way of illustration only, not of limitation; therefore, it would not constitute a departure from the basic principle of this invention to bring various modifications and variations, notably as far as the shape of the connecting plate 12, and the location of the cutter guides thereon, are concerned.

What is claimed is:

1. Cutter guides adapted to move while remaining constantly parallel to themselves and perpendicular to a cigarette rod in a cigarette making machine, said guides revolving about an axis at a uniform tangential speed equal to the feed rate of said rod, characterized in that said cutter guides are carried by a rigid connecting plate carrying three bearings receiving three crankpins of three identical crankpin-supporting disks, respectively, of which only one is rotatably driven, the other two revolving freely about their axes, said rigid connecting plate having substantially the shape of an isosceles triangle having a center line perpendicular to the cigarette rod, the bearings being disposed adjacent the vertices, the drive being applied to the driven crankpin positioned on said center line of the connecting plate and which is the bearing nearest to the cigarette rod, said cutter guides being secured to the lower part of the connecting plate, under said driven bearing, and having the same center line as said connecting plate.

2. Cutter guides according to claim 1, characterized in that the throw of said crankpins, on said connecting plate is adjustable.

3. Cutter guides according to claim 1, characterized in that the cutter guide elements are adjustable vertically in relation to an extension of said connecting plate, means being provided for locking said elements in the desired position.

* * * * *